US006874986B2

United States Patent
Köppel et al.

(10) Patent No.: US 6,874,986 B2
(45) Date of Patent: Apr. 5, 2005

(54) SELF-TAPPING FASTENER

(75) Inventors: Michael Köppel, Widnau (CH); Bernhard Hinz, Widnau (CH)

(73) Assignee: SFS Intec Holding AG, Heerbrugg (CH)

( * ) Notice: Subject to any disclaimer, the term of this patent is extended or adjusted under 35 U.S.C. 154(b) by 0 days.

(21) Appl. No.: 10/332,441

(22) PCT Filed: Jul. 2, 2001

(86) PCT No.: PCT/EP01/07526
§ 371 (c)(1),
(2), (4) Date: Jan. 8, 2003

(87) PCT Pub. No.: WO02/04822
PCT Pub. Date: Jan. 17, 2002

(65) Prior Publication Data
US 2003/0147717 A1 Aug. 7, 2003

(30) Foreign Application Priority Data
Jul. 10, 2000 (DE) .......................... 100 33 471

(51) Int. Cl.[7] .............................. F16B 21/00
(52) U.S. Cl. .................... 411/900; 411/386; 411/424
(58) Field of Search .............. 411/900, 386–387.8, 411/424

(56) References Cited

U.S. PATENT DOCUMENTS

| 2,853,410 A | * | 9/1958 | Lula ........................... 420/69 |
| 3,615,366 A | * | 10/1971 | Allen ........................... 420/42 |
| 4,281,429 A | * | 8/1981 | Van den Sype ............... 470/16 |
| 4,736,481 A | * | 4/1988 | Hulsey ......................... 470/10 |
| RE33,901 E | * | 4/1992 | Shinjo ...................... 411/387.1 |
| 6,332,934 B2 | * | 12/2001 | Tanida et al. ............... 148/325 |
| 6,464,804 B2 | * | 10/2002 | Goecmen et al. ........... 148/325 |
| 2001/0014262 A1 | * | 8/2001 | Friederich et al. | |

FOREIGN PATENT DOCUMENTS

| DE | 684060 | 11/1939 |
| DE | 19540848 | 5/1997 |
| DE | 19815670 | 11/1998 |

* cited by examiner

Primary Examiner—William L. Miller
(74) Attorney, Agent, or Firm—Volpe and Koenig, P.C.

(57) ABSTRACT

A self-tapping screw (1) consists of two interconnected sections (7 and 8) of stainless material. The first section (7) comprising the tool access (4) and the thread (6) consists of stainless, austenitic steel and the second section (8) configured as a boring part (5) consists of martensitic steel.

7 Claims, 1 Drawing Sheet

SELF-TAPPING FASTENER

BACKGROUND

The invention relates to a self-tapping fastener made of stainless steel having a tool access at one end and at its other end a shaft configured as a boring part, which optionally has a thread on a partial section.

There is constantly more and more demand for fasteners made of stainless steel, which can be used especially in construction, which provide sufficient strength and in addition feature optimum boring properties.

Heretofore, it has been conventionally assumed that, for fasteners made of stainless steel which must consist of an austenitic steel for reasons of strength, a boring part made of carbon steel has to be attached. However, with these appropriately hardenable boring parts there exists the disadvantage that rust formation takes place when they are left in the open. Therefore, even for esthetic reasons alone, there arose the demand to provide other possible embodiments of self-tapping fasteners.

A screw made of stainless steel has already become known (EP 0861379 B1), in which there is provided a first shaft section which includes the screw head made of austenitic steel and a second shaft section containing the screw tip made of martensitic hardenable steel with a carbon content of less than 0.01%. Such an arrangement is indeed already an advance in the direction of a completely stainless screw, but this minimal carbon content of less than 0.01% does not yet yield optimum boring properties.

SUMMARY

Therefore, the present invention has the object of providing a self-tapping fastener of the kind initially mentioned in which there is satisfied both the demand for stainless material in the bearing region of the fastener, but in which additionally optimum boring performance can be achieved despite stainless construction of the fastener in the region of the boring part.

This is achieved in accordance with the invention by forming a shaft of two sections of stainless material, which are connected to each other through positive, material and/or frictional engagement, in which the first section of the shaft having the tool access and optionally a threaded region is formed of a stainless, purely ferritic or austenitic steel or a stainless compound steel, while the second section of the shaft formed as the boring part or including the boring part is made of a martensitic stainless steel with a carbon content of 0.04% to 0.3%.

This results in very good connecting capabilities for the two sections because there are used two substances with practically equal temperature expansion. Both sections can be called stainless, although due to the increased carbon content in the martensitic stainless steel the boring properties can be substantially improved. This makes possible an optimal fastener construction because even the bearing region exhibits appropriate strength levels and the boring region entails excellent boring properties despite its stainless construction, because sufficient hardening becomes possible especially due to the appropriate carbon content.

Thus, with a self-tapping fastener of the inventive type it is possible without difficulty to also drill through stainless steel sheets.

Specifically, by the use of martensitic stainless steel with a carbon content of 0.04% to 0.3%, there also exists the possibility of hardening the second section in a conveyor furnace. In this way, especially in the industrial mass production of fasteners, there can be used an optimal and cost-effective possibility for appropriately hardening this section.

It is also possible to inductively harden the second section.

Thus, overall there is assured a simple manufacturing method for a self-tapping fastener made of stainless steel throughout.

In a specific embodiment, it is proposed that the martensitic stainless steel has a content of 0.04% to 0.3% carbon and 8% to 20% chromium and contains additional ingredients of molybdenum, nitrogen, manganese and nickel. This combination of materials assures that optimal cold forming is achieved for the production of the boring part and that sufficient hardness can be achieved in order to create a hole even in the most varied materials.

In so doing, a concrete embodiment contemplates that the martensitic stainless steel has a content of 0.1% carbon and 11.6% chromium and additional ingredients of 0.01% nitrogen, 0.6% manganese and 0.2% nickel.

It is further proposed that the first and second sections be connected to each other by means of welding, soldering, gluing, fitting, pressing-in or the like. Precisely through the choice of material for the two sections there result homogeneous, non-brittle connecting regions even when a welding process at appropriately high temperatures is used. However, especially for these two sections to be interconnected, there arise excellent possibilities for mutual connection by soldering, gluing, fitting or pressing-in. Thus, all varieties of mutual connection between the two sections are available, depending upon the structural configuration of the self-tapping fastener and depending upon the application for which such a self-tapping fastener is intended.

Within the scope of the invention, it is further possible for the fastener to have a surface treatment by passivation. By so doing, additional protection can be achieved and moreover, by appropriate surface treatment, the boring performance and the driving-in turning moment during thread formation can be improved.

BRIEF DESCRIPTION OF THE DRAWINGS

Additional inventive features and special advantages are explained in the description which follows, with reference to the drawing. There is shown in.

DETAILED DESCRIPTION OF THE PREFERRED EMBODIMENT(S)

The invention is predicated on a self-tapping fastener because the inventive features can be utilized for all kinds of self-tapping fasteners. In the description which follows, reference is made to examples which apply to a self-tapping screw. However, the inventive features can be applied in the same manner to self-tapping rivets, self-tapping pins or self-tapping dowels.

Figure 1:
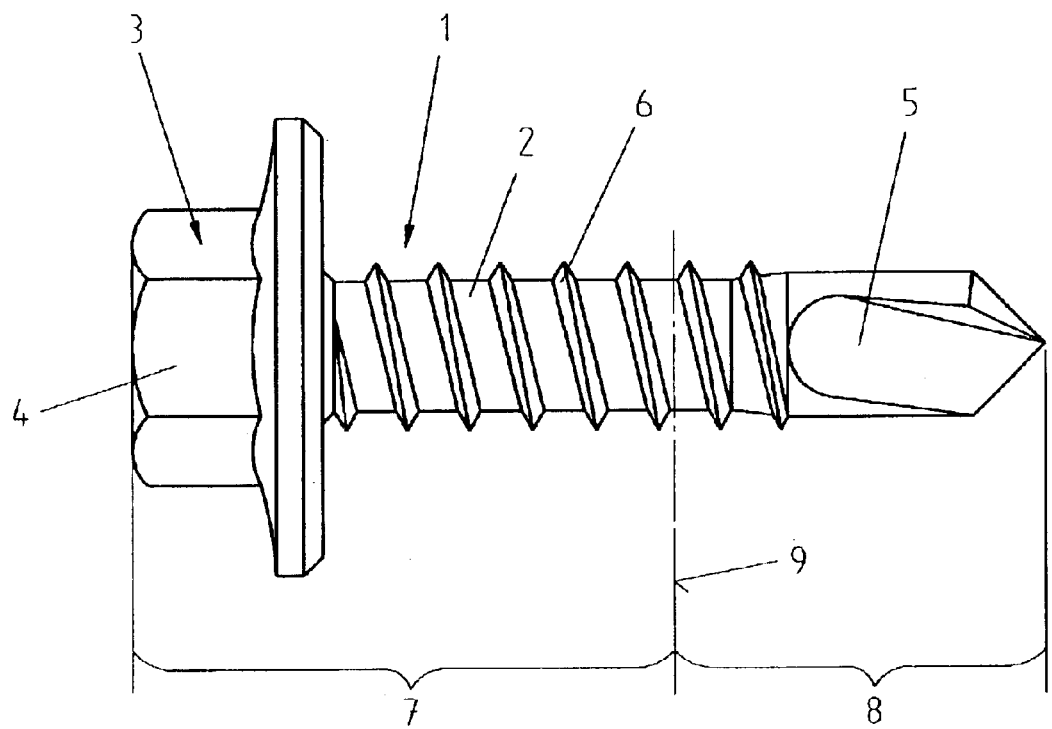
FIG. 1 a screw with a boring part in side view.
Figure 2:
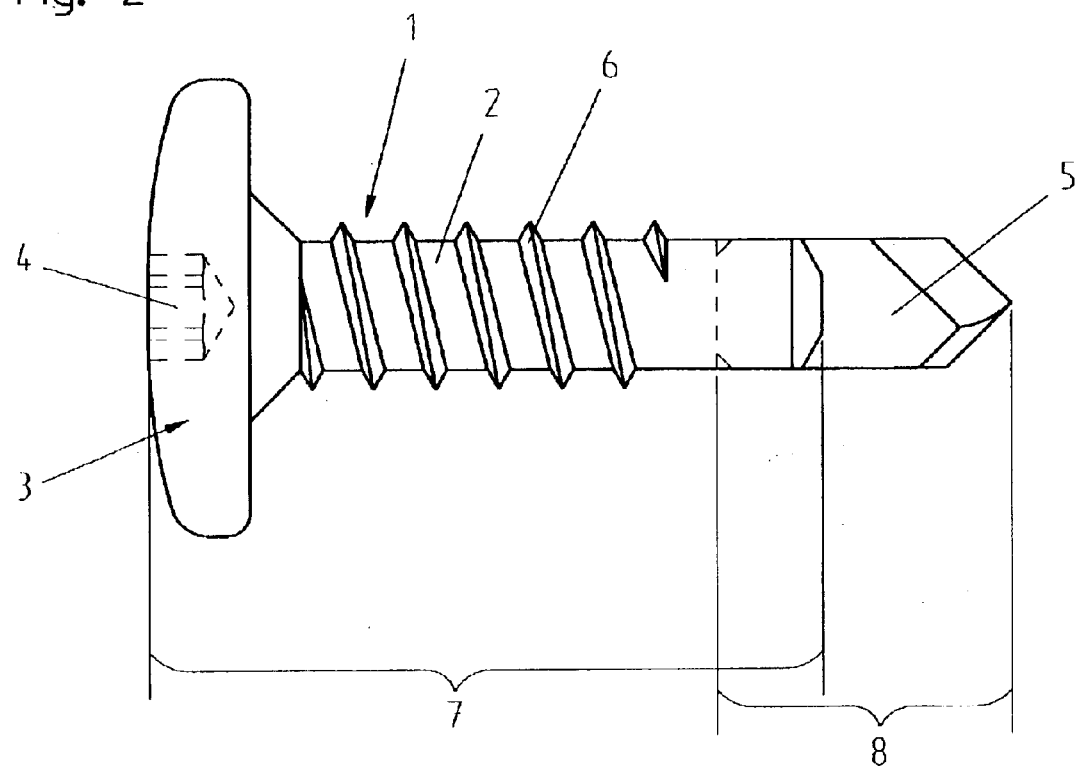
FIG. 2 a screw in side view with a boring part configured as a boring platelet.

In FIGS. 1 and 2, there is illustrated a self-tapping screw 1 which has a shaft 2, a screw head 3 with a tool access 4 as well as a boring part 5. The shaft 2 can optionally have a thread 6. In a screw 1, a thread or an appropriate thread region is of course always provided. But, when self-tapping rivets, self-tapping pins or self-tapping dowels are involved here, then no such threaded region is normally provided. In the embodiment of FIG. 1, the shaft 2 is formed of two sections 7 and 8, with both sections 7 and 8 being formed of a stainless material. These sections 7 and 8 are connected to each other through positive, material and/or frictional engagement, for example, through welding, soldering, gluing, fitting, pressing-in, or the like. However, it is also possible to use a purely positive engagement by providing an opening in one mutually opposing contact surface in one section 7 or 8 and in the other section 7 or 8 a corresponding pin, whereby, through appropriate shaping (e.g. square or hexagonal cross-section) mutual positive interlocking is enabled. In such a case, it is also possible to easily remove the boring part 5 after the screw has been driven in.

The first section 7 of the shaft which includes the tool access 4, i.e. the screw head 3 and the thread 6 in the present instance, is formed of a stainless, purely ferritic or austenitic steel. This makes it possible to reach the desired levels of strength which are demanded, for example, in using screws in building construction. It is then also conceivable to utilize a stainless compound steel which equals the purely ferritic or austenitic steel in its stainless properties and also in strength.

The second section 8 of shaft 2 formed as boring part 5 is made of a martensitic stainless steel with a carbon content of 0.04% to 0.3%.

In so doing, it is especially advantageous if the martensitic stainless steel has a content of 0.04% to 0.3% carbon and 8% to 20% chromium and additional ingredients of molybdenum, nitrogen, manganese and nickel. Optimum results can be achieved when the martensitic stainless steel exhibits a content of 0.1% carbon and 11.6% chromium and additional ingredients of 0.01% nitrogen, 0.6% manganese and 0.2% nickel.

Of course a screw according to FIGS. 1 and 2 can also be subjected to a surface treatment, in which case passivation is particularly advantageous. However, other surface treatment possibilities are also available.

From the production process standpoint, there exist various possibilities. Thus, it is conceivable to connect section 8 with section 7 before the boring part 5 is made or afterwards. In particular, by the specific material selection of the two stainless sections 7 and 8, it is possible to perform hardening of the section 8 in advance or after the connection of the two sections 7 and 8. In particular, due to the specific carbon content, it is possible to carry out hardening in simple manner in a conveyor furnace, so that industrial mass production becomes possible. Furthermore, inductive heating of the second section 8 is also quite possible.

The two sections 7 and 8 of shaft 2 are connected to each other at their mutually confronting end regions (represented by line 9). This separating plane can be so placed that the thread 6 extends across both sections 7 and 8, so that the thread is created after the mutual connection of the two sections 7 and 8. However, it can also be contemplated that this connecting region is made so that only the boring part is on section 5 and on section 7 there is the shaft 2 with the rolled-on thread 6.

In the embodiment of FIG. 2, it can be seen that the boring part 5 takes the form of a boring platelet which is inserted in a corresponding slot on the free end of the shaft 2 which forms section 7 and is attached in this slot. Thus, the entire shaft 2 including the screw head 3 can be considered as section 7, whereas section 8 is formed entirely of the boring part 5 configured as a boring platelet. In such a structure, the special advantages of the material selection for the two sections 7 and 8 can also be optimally exploited.

Within the scope of the invention, a self-tapping fastener of every kind can be utilized, even self-tapping screws 1 not being necessarily provided with as large a screw head 3 as illustrated in FIGS. 1 and 2. In practice, it is also possible to provide only a kind of shaft 2 which is provided with an internal tool access at the end facing away from the boring part 5. However, it would also be possible to provide at this end of the screw a kind of peg with tool access, this peg having an external dimension equal to or smaller than the outer thread diameter.

What is claim is:

1. A self-tapping fastener made of stainless steel having a shaft with a tool access at a first end and with a boring part at a second end, characterized in that the shaft is formed of two sections (7, 8) of stainless material, which are connected to each other by at least one of positive, material and frictional engagement, wherein the first section (7) of shaft (2) which has the tool access (4) and a threaded region, is made of stainless, purely ferritic or austenitic steel or stainless compound steel and a second section (8) of shaft (2) which is configured as the boring part (5) or includes the boring part (5) is made of a martensitic stainless steel with a carbon content of 0.04% to 0.3%.

2. A fastener according to claim 1, characterized in that the second section (8) is hardened in a conveyor furnace.

3. A fastener according to claim 1, characterized in that the second section (8) is inductively hardened.

4. A fastener according to claim 1, characterized in that the martensitic stainless steel has a content of 0.04% to 0.3% carbon and 8% to 20% chromium and additional ingredients of molybdenum, nitrogen, manganese and nickel.

5. A fastener according to claim 1, characterized in that the martensitic stainless steel has a content of 0.1% carbon and 11.6% chromium and additionally 0.01% nitrogen, 0.6% manganese and 0.2% nickel.

6. A fastener according to claim 1, characterized in that the first and second section (7, 8) are connected to each other by at least one of welding, soldering, gluing, fitting, or pressing-in.

7. A fastener according to claim 1, characterized in that it exhibits surface treatment through passivation.

* * * * *